R. LA FRANCE.
MECHANISM FOR TRANSFERRING GLASSWARE TO LEERS.
APPLICATION FILED MAR. 8, 1919.

1,413,741.

Patented Apr. 25, 1922.
5 SHEETS—SHEET 1.

INVENTOR
Richard La France,
By J. F. Rule,
His attorney

R. LA FRANCE.
MECHANISM FOR TRANSFERRING GLASSWARE TO LEERS.
APPLICATION FILED MAR. 8, 1919.

1,413,741. Patented Apr. 25, 1922.
5 SHEETS—SHEET 4.

INVENTOR
Richard La France.
By J. F. Rule,
His attorney.

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

MECHANISM FOR TRANSFERRING GLASSWARE TO LEERS.

1,413,741.

Specification of Letters Patent. Patented Apr. 25, 1922.

Application filed March 5, 1919. Serial No. 281,387.

*To all whom it may concern:*

Be it known that I, RICHARD LA FRANCE, a citizen of the United States, residing at Toledo, in the county of Lucas and State of Ohio, have invented new and useful Improvements in Mechanism for Transferring Glassware to Leers, of which the following is a specification.

My invention relates to mechanism for transferring bottles or other articles from a glass forming machine into the annealing oven or leer. The invention relates to a type of mechanism in which an endless conveyor carries the bottles to a position adjacent the leer. Suitable mechanism is provided for transferring the bottles from said conveyor into the leer. The conveyor and transfer device are mounted on a horizontally swinging frame arranged to be moved laterally step by step across the front of the leer, so that the bottles are placed in rows on the leer conveyor.

A feature of the present invention relates to the improved means by which each bottle is transferred from the conveyor into the path of a pusher device, by which the bottle is advanced to a point in proximity to the leer. The bottle is then moved into the path of a gripper device which operates to grip the bottle and carry it into the leer.

A further feature of the invention relates to improved mechanism for feeding the conveyor and gripper device step by step across the leer. Said mechanism is arranged to move the leer door step by step, carrying the conveyor frame with it. After one row of bottles has been placed within the leer the door feeding mechanism is automatically reversed and operates to place another row of bottles during its return movement. The feeding mechanism also includes means whereby one step in the feeding movement is omitted after the completion of each row, so that the first bottle in the succeeding row is placed directly in front of the end bottle in the row just finished, so that each row of bottles is complete.

Other features and advantages of the invention and the exact nature thereof will appear hereinafter.

Figure 8:
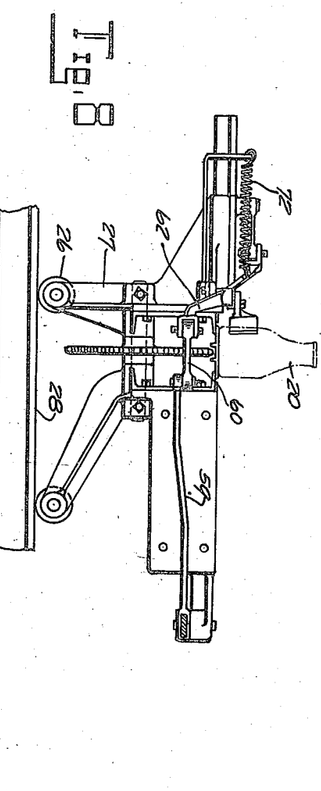
Figure 8 is a sectional elevation showing the conveyor and one of said pushers.
Figure 12:
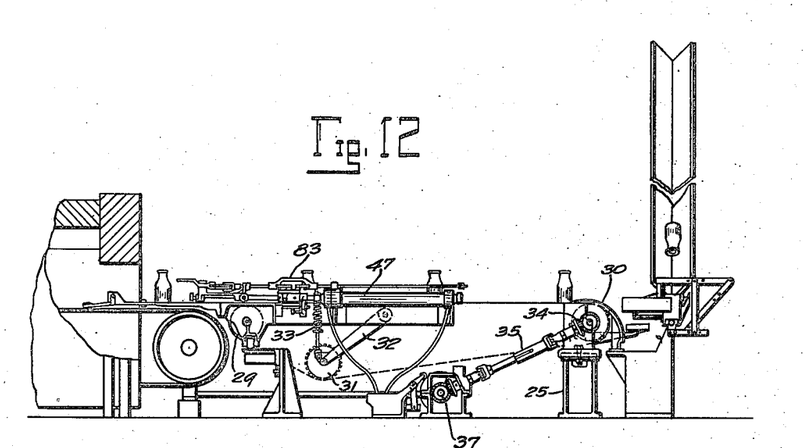
Figure 12 is an elevational view of the apparatus shown in Figure 1.

The bottles 20 or other articles which are to be conveyed to the leer are delivered seriatim by an inclined trough 21 to a setting-up apparatus 23 by which they are placed in an upright position on an endless conveyor 22. The setting-up mechanism 23 is not in itself a part of the present invention and may be of the construction disclosed, for example, in the patent to Lamb, 1,064,746, June 17, 1913, or of any other approved construction. The conveyor 22 is mounted on a frame 24 extending forward from the setting-up mechanism toward the leer. The rear end of the conveyor frame is pivotally mounted on a standard 25 (Fig. 12) permitting the forward end of the frame to swing back and forth across the front of the leer, so that the bottles may be deposited in rows on the leer conveyor. Rollers 26 (Fig. 8) on brackets 27 at the forward end of the conveyor frame run on a horizontal track 28.

The conveyor runs on front and rear sprockets 29 and 30 (Fig. 12) and an idler sprocket 31 on an arm 32. A spring 33 bears downward on said arm and thereby provides a tension device for the conveyor chain. The sprocket 30 is driven through a train of gearing comprising mitre gears 34, a shaft 35 having telescoping sections and a universal joint connection with said gears, mitre gears 36 and a power driven shaft 37.

Figures 6, 7:
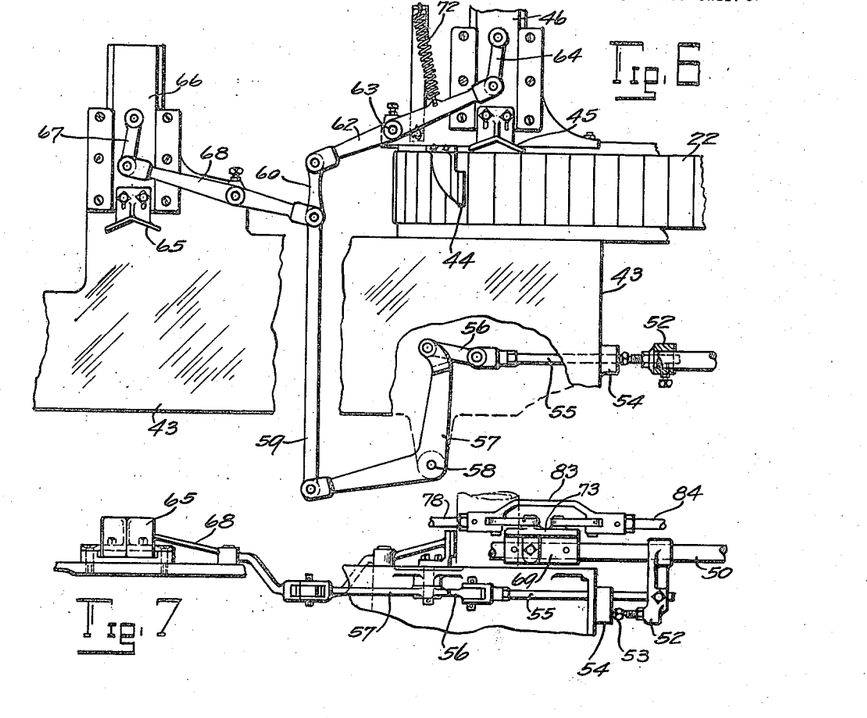
Figure 6 is a detail plan view showing two pushers, one of which pushes the bottle laterally off the conveyor and the other of which pushes the bottle into the path of the gripping device.
Figure 7 is a fragmentary elevation showing one of said pushers and associated mechanism.

Attached to the forward end of the conveyor frame 24 is a platform 43 onto which the bottles are transferred from the conveyor and from which they are moved into the leer. As the bottles approach the forward end of the conveyor 22 they are arrested by a stop 44 (Fig. 6) in position to be pushed sidewise off the conveyor onto the platform 43 by a pusher 45. This pusher is adjustably mounted on a slide 46.

The means for actuating the pusher 45 comprises a piston motor 47 attached by brackets 48 to the conveyor frame. The motor comprises a piston 49 and piston rod 50. Slidably mounted on the piston rod is a bracket 52 (Figs. 6 and 7) carrying an adjusting screw 53 which normally bears against a stop 54 on the platform 43. A rod 55 secured to the bracket 52 extends forward therefrom beneath the platform 43 and its forward end is connected through a link 56 to one arm of a bell crank 57 connected by a pivot 58 to the platform, the other arm of said bell crank being connected to a rod 59 extending transversely beneath the platform. A link 60 connects the rod 59 with one arm of the lever 62 pivoted at 63 to the conveyor frame, the other arm of said lever being connected through a link 64 to the slide 46. A second transverse pusher 65 adjustably mounted on a slide 66 is connected through a link 67 and lever 68 to the rod 59.

When the piston rod 50 moves rearwardly a block 69 thereon engages the bracket 52 and causes the latter to move with it during the final movement of the piston rod. This motion is transmitted through the bell crank 57 and connections just described to operate the pushers 45 and 65. The pusher 45 thereby shoves the bottle which has been arrested by the stop 44, onto the platform 43, leaving it in the path of a pusher 70 which operates to advance a bottle into the path of the pusher 65 as hereinafter described. Simultaneously with the operation of the pusher 45 the pusher 65 operates to push a bottle into position to be engaged by a gripper, which in turn carries the bottle forward into the leer. When the piston rod 50 moves forward it permits the pushers 45 and 65 to be retracted by a spring 72. The pusher 70 is attached to a plate 73 secured to and projecting laterally from the block 69 on the piston rod. The pusher, therefore, moves forward with the piston and slides the bottle forward from the position in which it has been placed by the pusher 45 into the path of the pusher 65.

The gripping device by which the bottles are carried into the leer comprises gripping jaws 74 connected by pivots 75 to a yoke 76 forming part of a truck or carriage 80 on which the gripper is mounted, the truck being secured to the forward end of the piston rod 50. The rear ends of the gripping levers are connected through links 77 to a rod 78 extending rearwardly through an end piece 79 on the truck 80. Said truck is provided with wheels 81 to run on the platform between guides 82. The rod 78 is connected at its rear end to a yoke 83, said yoke having attached thereto a rod 84 slidable in a guiding lug 85. The yoke 83 is connected to the piston rod 50 through the following mechanism:

A bell crank comprising arms 86 and 87 is connected by a pivot 88 to the plate 73 which, as before noted, is fixed to the piston rod. The bell crank has a short arm or extension in line with the arm 86 and extending in the opposite direction from the pivot 88, said short arm being connected by a link 89 to the yoke 83. A lever 92 pivoted at 93 to the plate 73, comprises a long arm to which is connected one end of a spring 94, the other end of said spring connected to the arm 86. The short arm of the lever 92 is connected through a link 95 to the yoke 83.

Figure 3:
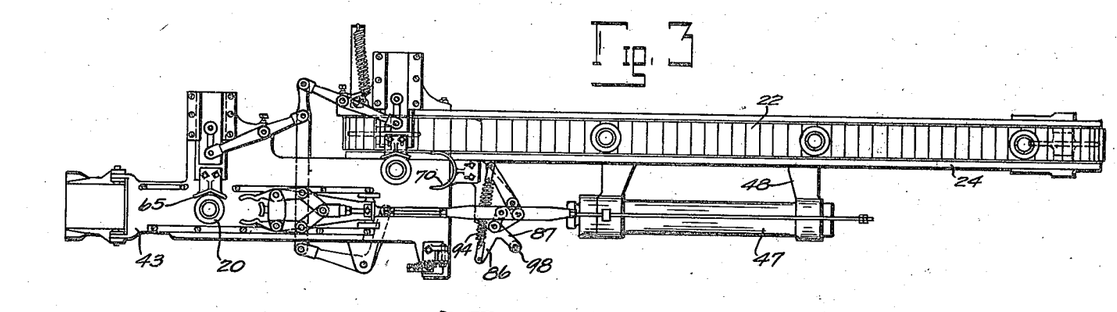
Figure 3 is a plan view showing the conveyor and the devices for transferring the bottles from the conveyor into the leer.
Figures 4, 5:
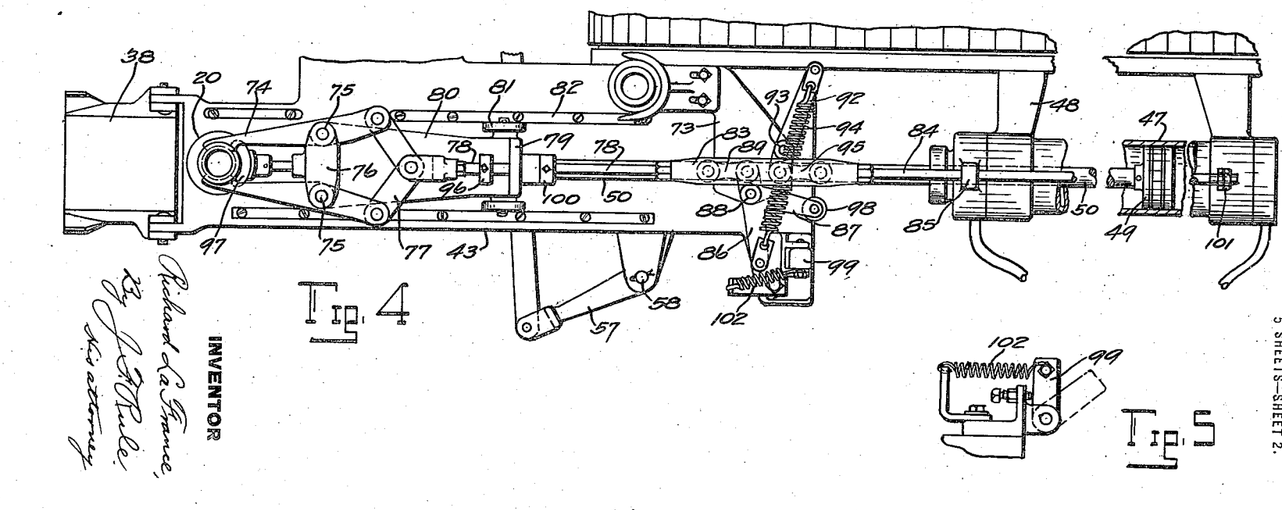
Figure 4 is a view on a larger scale of the mechanism shown in Figure 3.
Figure 5 is a detail of a trip device for operating the bottle gripping jaws.

During the initial forward movement of the piston rod 50 the gripping jaws 74 are open, the parts being in the position shown in Figure 3. At this time a stop 96 (Fig. 4) on the rod 78 abuts the end piece 79 and limits the opening movement of the gripping jaws, said stop being held in such position by the spring 94 acting through the two levers to which it is attached. The gripper is thus held open while it moves forward until a plate 97 at the forward end of the carriage is brought up to the bottle which has been placed in its path by the pusher 65. As the gripper reaches this point the jaws are brought together to grip the bottle by a snap action produced as follows:

A roll 98 on the bell crank arm 87 strikes a trip 99 (Figs. 4 and 5) and thereby arrests said arm. The continued forward movement of the plate 73 on which the bell crank is mounted causes the bell crank to swing from the Fig. 3 position toward the Fig. 4 position. This swinging movement is transmitted through the link 89 to the rod 78, thereby moving the latter forward relatively to the piston rod 50, so that the jaws 74 are moved toward gripping position. It will be noted that in Fig. 3 the spring 94 is to the left of the pivots for the bell crank lever and the lever 92, and in such position tends to hold the rod 78 in its rearward position relative to the piston rod. But as the bell crank swings rearward the spring is carried past the pivot 88 so that it throws the rod 78 forward quickly or with a snap action, causing the jaws to grip the bottle. The action of the spring through the lever 92 assists both in holding the jaws apart and snapping them closed. The forward movement of the rod 78 is limited by a stop 100 on the rod striking the carriage.

When the bottle is thus gripped the continued forward movement of the piston rod carries the gripper and bottle forward into the leer. As the piston approaches the limit of its forward movement a stop 101 on the rod 84 strikes the lug 85, thereby arresting the rod 78 so that the final movement of the piston rod will return the gripper to open position, thus releasing the bottle. The bell crank lever 86, 87 and associated parts are also returned to the Fig. 3 position. The trip 99 is pivotally mounted and held by a spring 102, permitting it to yield so that it will not interfere with the return movement of the bell crank. The bottles as they are pushed forward into the leer, slide down an inclined platform or chute 38 pivoted to the platform 43 and resting at its forward end on the leer conveyor.

Figures 1, 2:
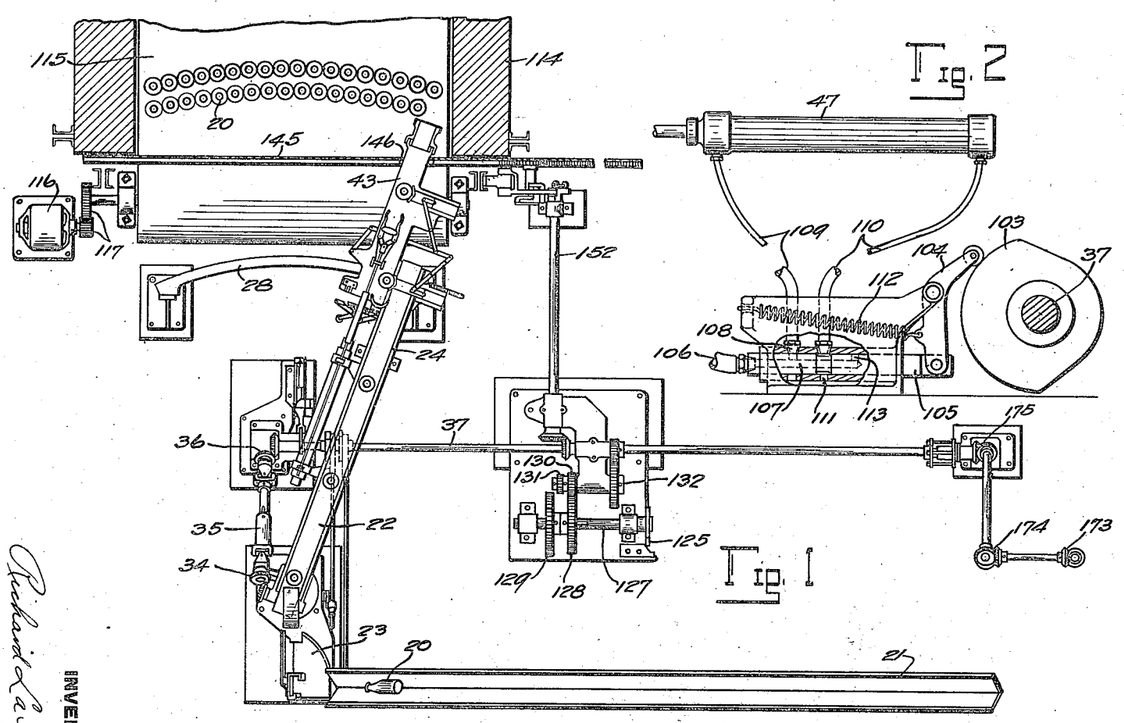
Figure 1 is a plan view of an apparatus embodying the principles of my invention, the leer being shown in section.
Figure 2 is a detail showing a piston motor, and means for operating its valves.

The piston motor 47 may be driven by compressed air supplied from any suitable source. The motor is controlled by a cam 103 (Fig. 2) on the shaft 37, which cam operates through a lever 104 to actuate a slide valve 105. With the parts in the position shown in Fig. 2, air under pressure from a pipe 106 passes through the central bore 107 in the slide valve to a port 108 and thence through a pipe 109 to the left hand end of the motor cylinder, thereby driving the piston to the right. The exhaust through the pipe 110 communicates with the atmosphere through a port 111. When the high portion of the cam 103 passes beyond the lever 104, a spring 112 moves the slide valve to the left, thereby bringing the pipe 110 in communication with the air pressure through a port 113, at the same time connecting the pipe 109 with the exhaust.

The leer 114 is provided as usual with a platform conveyor 115 on which the bottles are placed and carried rearwardly through the leer. This conveyor is driven by an electric motor 116 connected to the conveyor through suitable mechanism herein conventionally shown as including gears 117. The motor operates intermittently to advance the leer conveyor or pans one step after each row of bottles is placed thereon. A switch controlling the motor circuit (Fig. 13) comprises a stationary contact 118 and a movable contact 119 carried on a switch lever 120 pivoted at 122. The switch is normally held open by a spring 123 which holds the switch lever against a stop 124. The switch is closed by a cam 125 attached to a block 126 mounted to rotate with a shaft 127. (See Fig. 1). Gears 128 and 129 are feathered on the shaft 127 and shiftable lengthwise of the shaft to bring them alternatively into mesh with gears 130 and 131 on a stud shaft 132 geared to the shaft 37. Through the gearing just described the switch cam 125 is rotated and periodically brought into engagement with a pivoted detent 133 on the switch lever 120 to close the switch. Backward movement of the cam is permitted without operating the switch, owing to the pivotal connection of the detent 133, normally held by a spring 134 against a stop pin 135. The gearing is so proportioned that the circuit for the motor 116 is established after each complete row of bottles has been placed in the leer. By shifting the gears 128 and 129 so that the motion is transmitted through the gears 131 and 129, the speed of the cam shaft 127 is reduced, thereby increasing the interval between successive operations of the leer motor, thus permitting a larger number of bottles to be placed in a row, as is desirable when smaller sized bottles are being made.

Figure 13:
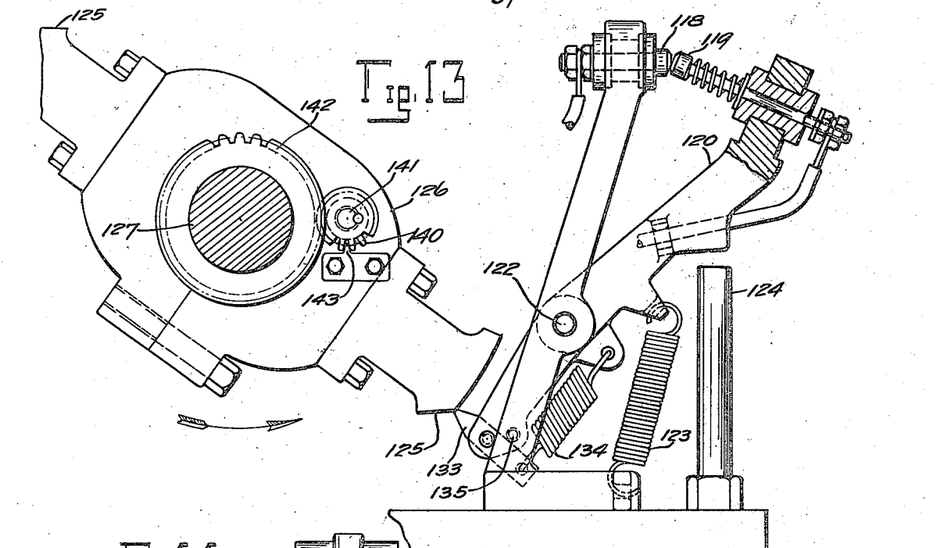
Figure 13 is a view of the switch controlling the motor for driving the leer conveyor and the cam for operating said switch.
Figure 14:
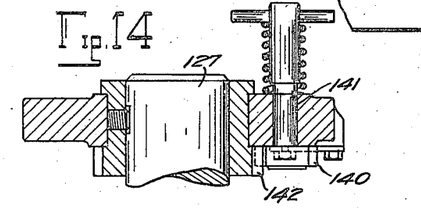
Figure 14 shows a device for adjusting the switch operating cam.

In Figs. 13 and 14 is shown a means for adjusting the angular position of the cam 125 on the shaft 127, thereby adjusting the timing of the leer motor with respect to the operation of the carrying in mechanism. This adjusting means comprises a gear pinion 140 keyed to a shaft 141 journalled in the block 126, said pinion meshing with a gear 142 keyed to the shaft 127. A detent 143 normally locks the pinion against rotation, but the pinion may be released by pressing inward on the shaft 141. The pinion may then be rotated about its axis, which causes it to travel around the gear 142 carrying with it the cam block 126. This permits adjustment of the cam around the shaft 127, so that the operation of the switch may be timed with respect to the operation of the gripper which places the bottles in the leer. If desired, two cams 125 may be mounted at diametrically opposite points so that the switch will be operated twice during each complete rotation of the shaft 127.

A leer door 145 extends across the front of the leer and is provided with an opening 146 through which the platform 43 extends, said opening being of a size to permit the passage of the bottles or other articles into the leer. This door is moved step by step in the direction of its length to swing the carrying-in mechanism across the leer, so that the bottles will be deposited in a row on the leer conveyor. The door is of such length that it will in all positions form a closure for the front of the leer.

Figure 9:
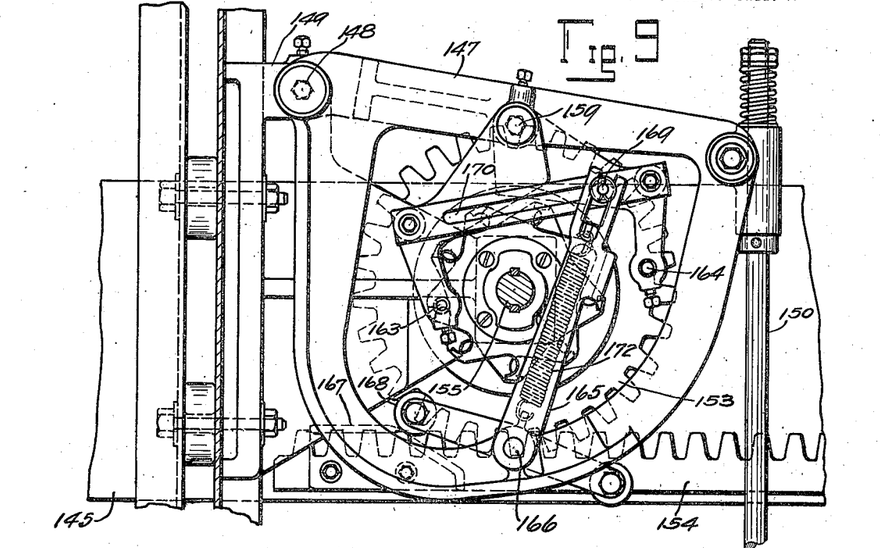
Figure 9 is an elevation of a mechanism for moving the leer door and carrying-in apparatus step by step.
Figure 10:
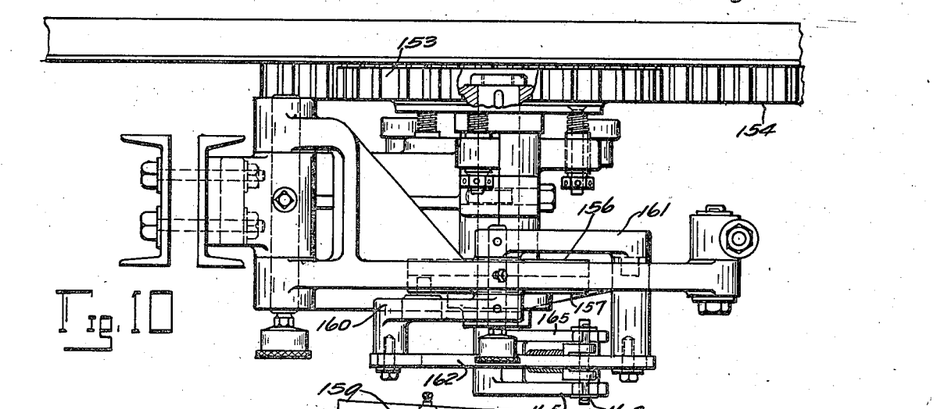
Figure 10 is a plan view of the same.
Figure 11:
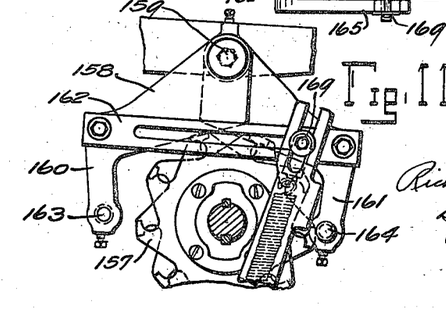
Figure 11 is a fragmentary view of mechanism shown in Figure 9, but with the parts in different position.

The mechanism for driving the door step by step, as shown in detail in Figs. 9 to 11, comprises a ring shaped driving element 147 connected by a pivot 148 to a stationary bracket 149. The driver 147 is reciprocated vertically by a rod 150 connected at its lower end to a crank arm on a horizontal shaft 152 (Fig. 1) geared to the shaft 37. This driver operates through intermediate mechanism, as will presently be described, to rotate a gear pinion 153 meshing with a rack 154 attached to the leer door and extending lengthwise thereof. The pinion 153 is keyed to a shaft 155 journalled in the bracket 149. Ratchet wheels 156 and 157 are also keyed to the shaft 155. The front ratchet 157 has its teeth formed for driving it in a counterclockwise direction, and the rear ratchet wheel 156 is formed to be driven in the reverse direction. A yoke 158 is hung by a pivot pin 159 from the upper arm of the driving frame 147. This yoke comprises arms 160 and 161 located respectively in front and rear of the frame 147, the outer ends of said arms having forward extensions connected by a cross bar 162. The arm 160 carries a dog 163 for driving the ratchet wheel 157. On the arm 161 is a dog 164 to drive the wheel 156.

While the yoke 158 remains in the Fig. 9 position, that is, swung to the right, the dog 163 co-operates with its wheel 157. As the rod 150 moves up the dog 163 slides upward along the face of a tooth and as the rod 150 moves downward, said dog engages the tooth and moves the ratchet wheel, thereby moving the leer door one step to the right. This step by step movement is continued until the complete row of bottles has been placed in the leer. The leer conveyor is now operated, as before described, to advance the row of bottles, making room for the succeeding row. The feeding mechanism (Fig. 9) is now reversed, so as to drive the leer door to the left as the next row of bottles is placed.

In order to place the first bottle in proper position it is necessary that the feeding mechanism shall skip one operation, that is, that one reciprocation of the rod 150 shall be effected without rotating the ratchet wheels. The mechanism for reversing the drive and causing this skip action is as follows:

A reversing switch comprises a pair of arms 165 secured to and projecting upwardly from a rock-shaft 166 mounted on the driving frame 147. This switch when thrown, operates to swing the yoke and reverse the drive. The throw of the switch is effected by a cam 167 connected to travel with the rack 154. As the rack completes its travel to the right, a roll 168 on an arm on the rock shaft 166 runs up on said cam and throws the switch to the Fig. 9 position. Said switch carries a pin 169 which slides in a slot 170 in the bar 162, and is also slidable in slots extending lengthwise in the arms 165, permitting the switch to be thrown to the right by the cam 167. A coil spring 172 connected at its upper end to the pin 169 pulls downward at the right hand side of the yoke and tends to throw the latter to the left, but such movement is temporarily prevented because the dog 163 is held by a tooth of its ratchet wheel 157. The frame 147 is at this time in its lowermost position. As said frame commences its upward movement, however, the dog 163 is released, permitting the spring to throw the yoke to the left, as shown in Fig. 11. This causes the dog 164 to strike the outer face of the wheel 156 just below the tip of the tooth. While the frame 147 is completing its upward stroke the dog 164 is carried upward to a point just below the tip of the next tooth. The frame 147 then moves downward without driving the ratchet wheel, except that just before the completion of the down stroke it engages a tooth and slightly moves the ratchet wheel, bringing it into position to make a complete index on the next down stroke of the frame. It will thus be seen that one reciprocation of the frame 147 takes place without driving the rack bar when the latter is at its limit of movement and that the driving dogs are automatically reversed. When the rack reaches the limit of movement to the left, the yoke is again reversed and one driving step omitted. This is effected by a cam similar to the cam 167 operating to throw the reversing switch 165 to the left, the operation being precisely like that just described.

The driving shaft 37 (Fig. 1) may be driven from the bottle blowing machine (not shown) through gears 173, 174 and 175 so that the carrying-in mechanism operates in synchronism or timed relation to the discharge of bottles, the speed of the carrying-in mechanism being adjusted to correspond to the delivery of bottles thereto.

Modifications may be resorted to within the spirit and scope of my invention and portions of the invention may be used without others.

What I claim is:

1. The combination with an article conveyor, of a platform beside the conveyor, a pusher operable to push each article transversely off the conveyor onto the platform, and a second pusher operable to then engage the article and push it along the platform in the direction in which it was carried by the conveyor before the next article is pushed off the conveyor.

2. The combination with an article conveyor, of a platform beside the conveyor, a pusher operable to push each article transversely off the conveyor onto the platform, a second pusher operable to then engage the article and push it along the platform in the direction in which it was carried by the conveyor before the next article is pushed off the conveyor, and means to impart a further transverse movement to the articles.

3. The combination with an endless conveyor operable to advance articles in single file, of a support beside of and extending beyond the delivery end of the conveyor, a pusher operable to push articles from the conveyor onto the support beside it, a second pusher operable alternately to the first pusher to push articles along the support to a point beyond the delivery end of the conveyor, and a third pusher beyond the conveyor operable simultaneously with and parallel to the first pusher to push articles over the support from the point where they are left by the second pusher.

4. The combination with an endless conveyor operable to advance articles in single file, of a support beside of and extending beyond the delivery end of the conveyor, a pusher operable to push articles from the conveyor onto the support beside it, a second pusher operable alternately to the first pusher to push articles along the support to a point beyond the delivery end of the conveyor, a third pusher beyond the conveyor operable simultaneously with and parallel to the first pusher to push articles over the support from the point where they are left by the second pusher, and a gripper movable over the support parallel to and simultaneously with the second pusher and operable to grip articles at the point where the third pusher leaves them and deposit them beyond the support.

5. The combination with an endless conveyor adapted to receive and convey articles seriatim, of a stop in the path of said articles to arrest them while on the conveyor, means to shift the articles laterally off the conveyor, a gripper, and means to operate the gripper to engage the articles, move the gripper bodily forward and then release it from the article.

6. The combination with an endless conveyor adapted to advance articles serially, of a receiving table at one side of the conveyor, a pusher operable to push the articles transversely off the conveyor onto said table, a gripper, and means to operate said gripper to engage an article on said table, advance it and then release it.

7. The combination with mechanism for conveying articles seriatim to a discharging point, means for shifting said mechanism transversely step by step first in one direction and then in the opposite direction for depositing the articles in rows, and means for causing one shifting operation to be omitted at the end of each row so that each row of articles will be complete.

8. The combination with mechanism for conveying articles seriatim to a discharging point, means for shifting said mechanism transversely step by step first in one direction and then in the opposite direction for depositing the articles in rows, means for causing one shifting operation to be omitted at the end of each row so that each row of articles will be complete, means providing a receiving surface on which the articles are deposited, and automatic means for advancing said surface after each row of articles is deposited thereon.

9. The combination with a leer, of a carrier therein, mechanism for conveying articles serially to the leer, means for shifting said mechanism step by step transversely of the leer, first in one direction and then in the other to cause the articles to be placed in rows on the leer carrier, automatic mechanism operating in timed relation to said conveying mechanism to advance the leer carrier one step after each row of articles has been placed thereon, and automatic means for causing one step in said shifting to be omitted after each row of articles has been deposited, whereby the succeeding row will be complete.

10. A gripping device comprising gripping jaws, an actuator for opening and closing the jaws and a spring acting on the actuator to complete its movement when it is moved towards either jaw closing or jaw opening position.

11. The combination of a gripping device comprising a pair of gripping jaws, a carriage on which the jaws are mounted, means to reciprocate the carriage, an actuator for opening and closing said jaws, means to move said actuator as the carriage advances towards jaw closing position, spring means to complete the jaw closing movement, and means to automatically open the jaws as the carriage completes its forward movement.

12. The combination of a gripping device comprising pivoted gripping jaws, a carriage on which said jaws are mounted, means to reciprocate said carriage, an actuating rod connected to said jaws and operable by a movement in one direction to move the jaws to gripping position and by a movement in the reverse direction to separate said jaws, a lever connected to said actuating rod, a spring operating through said lever to hold the jaws in gripping position, said spring operable when the lever is shifted to another position to hold the gripping jaws open, and a trip device in the path of said lever operable as said carriage advances to throw said lever and cause the jaws to move to gripping position, and means operable as the carriage completes its forward movement to reverse said actuating rod and thereby release the gripping jaws.

13. The combination of a gripping device comprising a pair of gripping jaws, a carriage on which the jaws are mounted, a motor comprising a reciprocating piston and a piston rod connected to said carriage, an actuating rod connected to the gripping jaws and operable to open and close them by a reciprocating movement of the actuating rod relative to the piston rod, means operable during the forward movement of the piston rod to advance the actuating rod relative thereto and thereby move the jaws to gripping position, and a stop to arrest said actuating rod as said carriage approaches the limit of its movement in one direction and thereby open the gripping jaws.

14. The combination of a gripping device comprising a pair of gripping jaws, a carriage on which the jaws are mounted, a motor comprising a reciprocating piston and a piston rod connected to said carriage, an actuating rod connected to the gripping jaws and operable to open and close them by a reciprocating movement of the actuating rod relative to the piston rod, and a stop to arrest said actuating rod as said carriage approaches the limit of its movement in one direction and thereby open the gripping jaws.

15. The combination of a reciprocating driver, a gripper carried thereby, a pusher operable to push articles transversely into the path of the gripper, operating connections between the driver and said pusher for causing the latter to move an article into the path of the gripper as the latter advances, automatic means to cause the gripper to engage the article and advance it, and automatic means to release the gripper from said article as the driver completes its forward movement.

16. The combination with a motor comprising a reciprocating piston and piston rod, of a pusher connected to said rod, a gripper also connected to said rod in advance of the pusher, transverse pushers operable respectively to push articles into the path of said first mentioned pusher and the gripping device, and connections between the piston rod and said transverse pushers for actuating the latter during the initial advance of the piston rod, said first mentioned pusher operable to advance the articles into the path of the foremost transverse pusher.

17. The combination with conveying mechanism to advance articles serially to a delivery point, of means to shift said mechanism step by step first in one direction and then in the opposite direction for placing the articles in rows, said means comprising a rack and pinion, ratchet wheels operative respectively to drive the pinion in opposite directions, dogs for the respective wheels, and means for shifting said dogs into operative relation alternatively with said wheels.

18. The combination of a gripping device comprising a pair of gripping jaws, a carriage on which the jaws are mounted, a motor comprising a reciprocating piston and a piston rod connected to said carriage, an actuating rod connected to the gripping jaws and operable to open and close them by a reciprocating movement of the actuating rod relative to the piston rod, a stop to arrest said actuating rod as said carriage approaches the limit of its movement in one direction and thereby open the gripping jaws, and mechanism operating in synchronism with the gripping device to place articles serially into position to be engaged by the gripping jaws and advanced with the carriage.

19. The combination of a continuously moving conveyor arranged to carry articles placed upright thereon toward a discharge portion, a stop to arrest said articles, a pusher arranged to push the arrested articles transversely off the conveyer, a platform beside the conveyer to receive said articles, and means to take the articles from said platform and deposit them beyond the platform in the direction in which they are moved by the conveyer.

Signed at Toledo, in the county of Lucas and State of Ohio, this 4th day of March, 1919.

RICHARD LA FRANCE.